United States Patent
Muradore

(10) Patent No.: US 10,473,952 B2
(45) Date of Patent: Nov. 12, 2019

(54) METHOD FOR OPTIMIZING AN OPTICAL SURFACE

(71) Applicant: Essilor International, Charenton le Pont (FR)

(72) Inventor: Fabien Muradore, Charenton le Pont (FR)

(73) Assignee: Essilor International, Charenton le Pont (FR)

( * ) Notice: Subject to any disclaimer, the term of this patent is extended or adjusted under 35 U.S.C. 154(b) by 859 days.

(21) Appl. No.: 14/898,413

(22) PCT Filed: Jun. 13, 2014

(86) PCT No.: PCT/EP2014/062368
§ 371 (c)(1),
(2) Date: Dec. 14, 2015

(87) PCT Pub. No.: WO2014/198889
PCT Pub. Date: Dec. 18, 2014

(65) Prior Publication Data
US 2016/0139427 A1 May 19, 2016

(30) Foreign Application Priority Data

Jun. 13, 2013 (EP) .................... 13305798

(51) Int. Cl.
*G05B 13/04* (2006.01)
*G02C 7/02* (2006.01)
(Continued)

(52) U.S. Cl.
CPC .......... *G02C 7/028* (2013.01); *G02C 7/024* (2013.01); *G02C 7/027* (2013.01); *G02C 7/066* (2013.01); *G02C 13/003* (2013.01)

(58) Field of Classification Search
CPC ........ G02C 7/028; G02C 7/061; G02C 7/027; G02C 7/024; G02C 7/02; G02C 7/025;
(Continued)

(56) References Cited

U.S. PATENT DOCUMENTS 6,256,098 B1 * 7/2001 Rubinstein ........... G01B 11/255
356/602
6,302,540 B1 * 10/2001 Katzman ................ G02C 7/028
351/159.74

(Continued)

FOREIGN PATENT DOCUMENTS

EP 2 028 529 2/2009
EP 2 031 435 3/2009
(Continued)

OTHER PUBLICATIONS

B. Bourdoncle et al., "Ray-tracing through progressive ophthalmic lenses", SPIE vol. 1354, pp. 193-199, The International Society for Optical Engineering—International Lens Design Conference (1990),—, © 1991 by the Society of Photo-Optical Instrumentation Engineers.
(Continued)

*Primary Examiner* — Darrin D Dunn
(74) *Attorney, Agent, or Firm* — Oblon, McClelland, Maier & Neustadt, L.L.P.

(57) ABSTRACT

Method for optimizing an optical surface comprising: an initial optical surface providing step, a working optical surface defining step, during which a working optical surface is defined to be equal to the initial optical surface, a first surface cost function providing step, during which a first surface cost function of the nth derivative of the surface is provided, a set of surface cost functions providing step, during which a set of surface cost functions function of at least one criterion over evaluation zones is provided, a global surface cost function evaluation step during which a global surface cost function equal to a weighted sum of the
(Continued)

previous cost functions is evaluated, a modifying step, during which the working surface is modified, wherein the evaluation and modifying steps are repeated so as to minimize the global surface cost function.

13 Claims, 3 Drawing Sheets

(51) Int. Cl.
   *G02C 13/00* (2006.01)
   *G02C 7/06* (2006.01)
(58) Field of Classification Search
   CPC ..... G02C 7/066; G02C 7/063; G06F 17/5081; G06F 2217/08; G06F 2217/16
   See application file for complete search history.

(56) References Cited

U.S. PATENT DOCUMENTS

| | | | | |
|---|---|---|---|---|
| 6,661,523 | B1* | 12/2003 | Rubinstein | G01B 11/255 356/601 |
| 7,044,601 | B2* | 5/2006 | Wang | G02C 7/024 351/159.06 |
| 8,882,268 | B2* | 11/2014 | Calixte | G02C 7/027 351/159.77 |
| 9,360,684 | B2* | 6/2016 | Contet | G02C 7/028 |
| 9,547,183 | B2* | 1/2017 | Muradore | G02C 7/028 |
| 9,993,150 | B2* | 6/2018 | Swital | G06Q 30/0621 |
| 2003/0090623 | A1* | 5/2003 | Rubinstein | G02C 7/028 351/159.74 |
| 2005/0052615 | A1* | 3/2005 | Wang | G02C 7/024 351/159.52 |
| 2005/0254007 | A1* | 11/2005 | Wang | G02C 7/024 351/159.06 |
| 2007/0182923 | A1* | 8/2007 | Kitani | G02C 7/028 351/159.42 |
| 2009/0012923 | A1* | 1/2009 | Moses | G06Q 10/10 706/46 |
| 2010/0004770 | A1* | 1/2010 | Rameau | G06F 17/50 700/98 |
| 2010/0205127 | A1* | 8/2010 | Chen | G06N 3/126 706/13 |
| 2011/0202286 | A1* | 8/2011 | De Rossi | G02C 7/02 702/19 |
| 2012/0004754 | A1* | 1/2012 | Moine | G02C 7/024 700/103 |
| 2012/0016644 | A1* | 1/2012 | De Rossi | G02C 7/02 703/2 |
| 2012/0057123 | A1* | 3/2012 | Mandler | G02C 7/02 351/159.74 |
| 2012/0113394 | A1* | 5/2012 | Bonnin | G02B 27/0172 351/237 |
| 2012/0212705 | A1* | 8/2012 | Calixte | G02C 7/027 351/159.74 |
| 2012/0287405 | A1* | 11/2012 | Mousset | G01M 11/0228 351/246 |
| 2013/0000505 | A1* | 1/2013 | Tao | G03F 7/70441 101/450.1 |
| 2013/0107204 | A1* | 5/2013 | Spratt | G02C 7/027 351/159.74 |
| 2013/0329186 | A1* | 12/2013 | Contet | G02C 7/028 351/159.77 |
| 2014/0142998 | A1* | 5/2014 | Kroeger | G06Q 10/06311 705/7.13 |

FOREIGN PATENT DOCUMENTS

| | | |
|---|---|---|
| WO | WO 00/52517 | 9/2000 |
| WO | WO 2012/008975 | 1/2012 |

OTHER PUBLICATIONS

J. Loos et al., "A variational approach to progressive lens design", Computer Aided Design, Elsevier Publishers BV., Barking, GB, vol. 30, No. 1, pp. 595-602, Jul. 1, 1998.

C. Jiguo et al., "Estimating curves and derivatives with parametric penalized spline smoothing", Statistics and Computing, Kluwer Academic Publishers, BO, vol. 22, No. 5, pp. 1059-1067, Sep. 23, 2011.

Ophthalmic optics—Uncut finished spectacle lenses—Part 2: Specifications for progressive power lenses, International Standard, ISO 8980-2, Second Edition, Feb. 1, 2004.

* cited by examiner

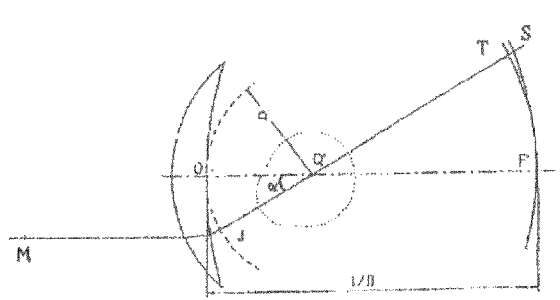 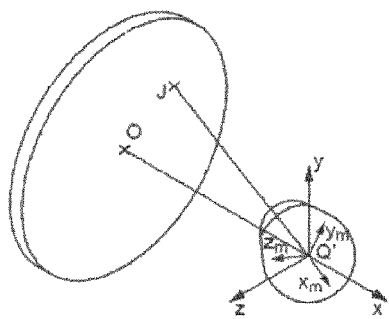
Fig. 4    Fig. 5
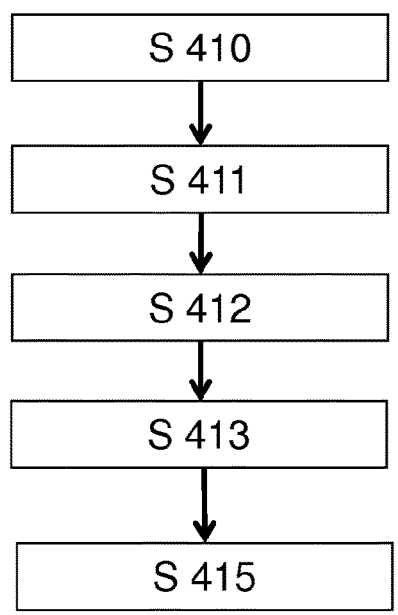
Fig. 6

METHOD FOR OPTIMIZING AN OPTICAL SURFACE

RELATED APPLICATIONS

This is a U.S. national stage application under 35 USC § 371 of International application No. PCT/EP2014/062368 filed on Jun. 13, 2014. This application claims the priority of European application no. 13305798.4 filed Jun. 13, 2013, the entire content of which is hereby incorporated by reference.

FIELD OF THE INVENTION

The invention relates to a method implemented by computer means for optimizing at least one optical surface of an optical lens.

BACKGROUND OF THE INVENTION

The discussion of the background of the invention herein is included to explain the context of the invention. This is not to be taken as an admission that any of the material referred to was published, known or part of the common general knowledge at the priority date of any of the claims.

An optical lens is typically made of plastic or glass material and generally has two opposed surfaces which co-operate with one another to provide a required corrective prescription. The shape and positions of the opposite surfaces determines the optical function of the optical lens.

Usually the shape of each optical surface is determined using optimization methods. Known optimization methods are developed so as a set of selected criteria reach or approach target values.

With the development of personalized optical lenses, the number of criteria to be considered increases and the resource required for the optimization method also increases together with the time required for the optimization method.

Furthermore, the inventors have observed that with known optimization methods the surfaces obtained may present number of curvature variations, in particular on the periphery of the optimized optical surfaces.

SUMMARY OF THE INVENTION

One object of the present invention is to provide a method of optimization that allows considering a great number of criteria and that provides a smooth surface.

In accordance with a first aspect of the invention there is provided a method implemented by computer means for optimizing at least one optical surface of an optical lens, the method comprising:
  an optical surface parameter providing step, during which at least one parameter that defines the optical surface to be determined is provided,
  a first surface cost function providing step, during which a first surface cost function is provided, the first surface cost function being a function of the nth derivative of the surface defined by the at least one parameter with n an integer greater than or equal to 2,
  a set of surface cost functions providing step, during which a set of surface cost functions is provided, each surface cost function of the set of surface cost functions being a function of at least one criterion over an evaluation zone of the surface defined by the at least one parameter and the set of surface cost functions comprising at least one cost function,
  an optical surface parameter determining step, during which the value of the at least one optical surface parameter that minimizes a global surface cost function is determined, the global surface cost function being a weighted sum of the first surface cost function and each surface cost function of the set of surface cost functions.

Advantageously, by using the first cost function, the method according to the invention allows providing a smooth surface. Furthermore, by defining a set of surface cost functions over evaluation zones, the method according to the invention avoids having to define criteria over the entire surface and only over the evaluation zones.

According to further embodiments which can be considered alone or in combination:
during the optical surface parameter providing step the initial value of the at least parameter is provided, defining an initial optical surface,
the method further comprises:
  a working optical surface defining step (S12), during which a working optical surface (Li) is defined to be equal to at least a portion of the initial optical surface (L0),
  a global surface cost function evaluation step (S41), during which the global surface cost function is evaluated,
  a modifying step (S42), during which the working surface is modified,
the first cost function is a function of the nth derivative of the working surface, each surface cost function of the set of surface cost functions is a function of at least one criterion over an evaluation zone of the working surface,
the value of the at least one optical parameter is determined by repeating the evaluation and modifying steps so as to minimize the global surface cost function; and/or
the at least one criterion of each surface cost function of the set of surface cost functions is a surface criterion over at least a part of the evaluation zone; and/or
the at least one criterion of each surface cost function of the set of surface cost functions is selected in the list consisting of: the minimum, maximum or mean sphere in at least one point of the evaluation zone, the mean sphere over the evaluation zone, the cylinder in at least one point of the evaluation zone, the mean cylinder over the evaluation zone, the altitude of at least one point of the evaluation zone, the mean altitude over the evaluation zone, the gradient of minimum, maximum, or mean sphere in at least one point of the evaluation zone, the second order derivation of the sphere in at least one point of the evaluation zone, the Gauss curvature in at least one point of the evaluation zone, the gradient of the Gauss curvature in at least one point of the evaluation, the minimal curvature in at least one point of the evaluation zone, the normal curvature in at least one point of the evaluation zone; and/or
the evaluation zone of each surface cost function of the set of surface cost functions is selected in the lists consisting of: near vision zone, far vision zone, the intermediate corridor between the near and far vision zone, a peripheral rim, a nasal zone, and a temporal zone; and/or
the optical lens is an ophthalmic lens adapted for a wearer and at least one of the criteria of one of the surface cost functions of the set of surface cost functions is related to the wearer's prescription; and/or
n is smaller than or equal to 4; and/or in the global surface cost function the weight of the first surface cost function represents between 0.1% and 10% of the total weights; and/or the optical lens is an ophthalmic lens adapted for a wearer; and/or the method further comprises prior to the optical parameter determining step a contour data providing step during which contour data representing a contour of a spectacle frame is provided; and/or at least one of the surface cost functions of the set of surface cost functions is a function of the deviation between the contour of the spectacle frame and the surface of the ophthalmic lens; and/or the contour data provided during the contour data providing step is obtained by a method implemented by computer means for optimizing a measured contour of the spectacle frame, the method comprising:

a contour data providing step, during which a contour data representing measured points of a contour of the spectacle frame is provided, a working contour defining step, during which a working contour of the spectacle frame is defined, a first contour cost function providing step, during which a first contour cost function is provided, the first contour cost function being a function of the mth derivative of the curve of at least a portion of the working contour with m an integer greater than or equal to 2, a set of contour cost functions providing step, during which a set of contour cost functions is provided, each contour cost function of the set of contour cost functions being a function of at least the deviation between the working contour and the measured points of the contour and the set of contour cost functions comprising at least one contour cost function, a global contour cost function evaluation step during which a global contour cost function is evaluated, the global contour cost function being a weighted sum of the first contour cost function and of each contour cost function of the set of contour cost functions, a contour modifying step, during which the working contour is modified, wherein the global contour cost function evaluation and contour modifying steps are repeated so as to minimize the global contour cost function; and/or m is smaller than or equal to 4; and/or the first contour cost function is a function of the mth derivative of the curve of the entire working contour; and/or in the global contour cost function the weight of the first contour cost function represents between 0.1% and 10% of the total weights; and/or According to a further aspect, the invention relates to a computer program product comprising one or more stored sequences of instructions that are accessible to a processor and which, when executed by the processor, causes the processor to carry out the steps of the method according to an embodiment of the invention.

Another aspect of the invention7 relates to a computer readable medium carrying one or more sequences of instructions of the computer program product according to an embodiment of the invention.

Another aspect of the invention relates to a program which makes a computer execute the method according to an embodiment of the invention.

Another aspect of the invention also relates to a computer-readable storage medium having a program recorded thereon; where the program makes the computer execute the method according to an embodiment of the invention.

Another aspect of the invention relates to a device comprising a processor adapted to store one or more sequence of instructions and to carry out at least one of the steps of the method according to an embodiment of the invention.

Unless specifically stated otherwise, as apparent from the following discussions, it is appreciated that throughout the specification discussions utilizing terms such as "computing", "calculating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

Non limiting embodiments of the invention will now be described with reference to the accompanying drawings in which:

FIGS. 3 and 4 show, diagrammatically, optical systems of eye and lens, FIG. 5 shows a ray tracing from the center of rotation of the eye, and FIG. 6 is flowchart representing the steps of a method according to different embodiments of the invention.

Elements in the figures are illustrated for simplicity and clarity and have not necessarily been drawn to scale. For example, the dimensions of some of the elements in the

DETAILED DESCRIPTION OF THE DRAWINGS

Figure 1:
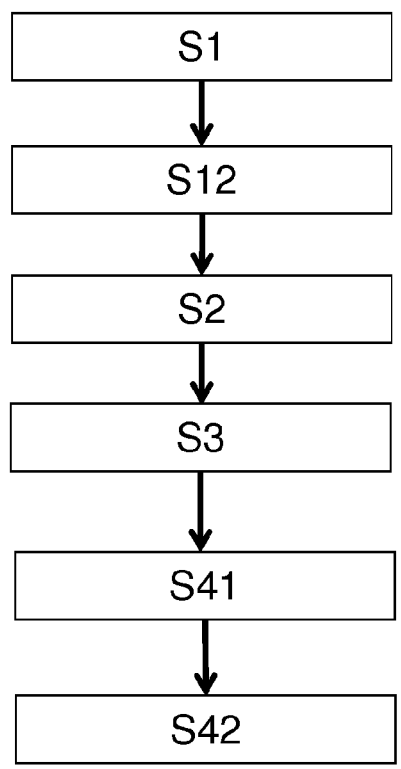
FIG. 1 is flowchart representing the steps of a method according to different embodiments of the invention.

According to an embodiment of the invention illustrated on FIG. 1, the method for optimizing at least one optical surface of an optical lens according to the invention comprises:
- an optical surface parameter providing step S1,
- a working optical surface defining step S12,
- a first surface cost function providing step S2,
- a set of surface cost functions providing step S3,
- a global surface cost function evaluation step S41, and
- a modifying step S42.

The evaluation and modifying steps are repeated so as to minimize the global surface cost function as evaluated in the global surface cost function evaluation step S41.

During the optical surface parameter providing step S1, at least one parameter that defines the optical surface to be determined is provided. For example an initial optical surface IS to be optimized is provided.

A working surface WS is defined during the working optical surface defining step S12. The working optical surface WS is initially defined as equal to the initial optical surface IS.

According to an alternative embodiment, the working optical surface WS is initially defined as equal to a portion of the initial optical surface IS.

A first surface cost function J1 is provided during the first surface cost function providing step S2. The first surface cost function J1 is a function of the nth derivative of the working surface WS with n an integer greater than or equal to 2. According to an embodiment of the invention n is smaller than or equal to 4.

According to a preferred embodiment of the invention, the first surface cost function is directly proportional to the nth derivative of the working surface WS. In other words, the first cost function J1 is minimum when the nth derivative of the working surface is minimum.

A set of surface cost functions J2, J3, ..., Jp is provided during the set of surface cost functions providing step S3, p being an integer greater than or equal to 2, i.e. the set of surface cost functions comprises at least one cost function.

Each surface cost function of the set of surface cost functions is a function of at least one criterion over an evaluation zone of the working optical surface.

According to an embodiment of the invention, at least one evaluation zone is defined on the initial surface and a cost function is associated to the evaluation zone. The cost function is a function of the value of at least one criterion of the evaluation zone.

The evaluation zone may be of any type and have any shape. For example the evaluation zone may be a peripheral rim, in particular the rim of a selected spectacle frame intended to be used with the ophthalmic lens.

The evaluation zone may further be a nasal zone or a temporal zone of the optical lens.

When the optical surface to be optimized is an optical surface of a progressive addition lens, the evaluation zones may be the near vision zone, and/or the far vision zone, and/or an intermediate corridor between the near and far vision zones. The far vision zone corresponds to a zone around the far vision point and the near vision zone corresponds to a zone around the near vision point.

Figure 2:
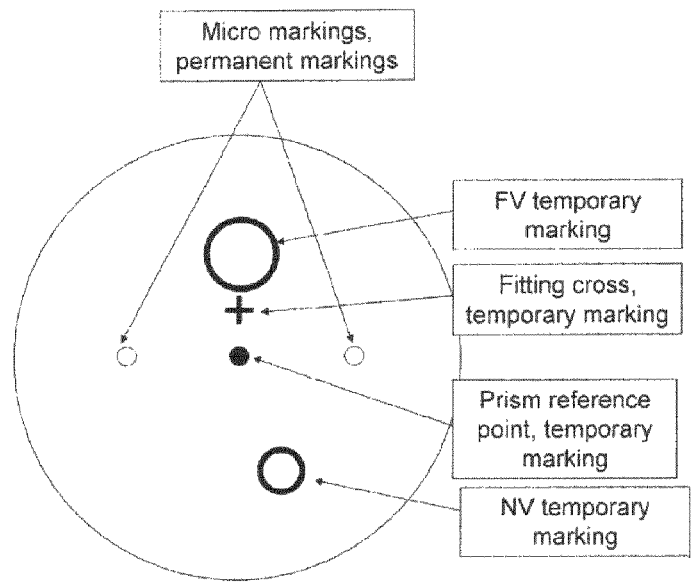
FIG. 2 shows a lens bearing temporary markings applied by the lens manufacturer.

Progressive lenses comprise micro-markings that have been made mandatory by a harmonized standard ISO 8980-2. Temporary markings may also be applied on the surface of the lens, indicating diopter measurement positions (sometimes referred to as control points) on the lens, such as for far vision and for near vision, a prism reference point and a fitting cross for instance, as represented on FIG. 2. It should be understood that what is referred to herein by the terms far vision point and near vision point can be any one of the points included in the orthogonal projection on the first surface of the lens, of respectively the FV and NV temporary markings provided by the lens manufacturer. If the temporary markings are absent or have been erased, it is always possible for a skilled person to position such control points on the lens by using a mounting chart and the permanent micro-markings.

The criteria of each of the cost function Ji of the set of cost functions may be a surface criterion at a given point of the evaluation zone or over part, for example all, of the evaluation zone.

For example, the surface criterion may be selected among the list consisting of: the sphere in at least one point of the evaluation zone, the mean sphere over the evaluation zone, the cylinder in at least one point of the evaluation zone, the mean cylinder over the evaluation zone, the altitude of at least one point of the evaluation zone, the mean altitude over the evaluation zone, the gradient of sphere in at least one point of the evaluation zone, gradient of cylinder in at least one point of the evaluation zone, the second order derivation of the sphere in at least one point of the evaluation zone, the second order derivation of the cylinder in at least one point of the evaluation zone.

As is known, a minimum curvature $CURV_{min}$ is defined at any point on an aspherical surface by the formula:

$$CURV_{min} = \frac{1}{R_{max}}$$

where $R_{max}$ is the local maximum radius of curvature, expressed in meters and $CURV_{min}$ is expressed in dioptres.

Similarly, a maximum curvature $CURV_{max}$ can be defined at any point on an aspheric surface by the formula:

$$CURV_{max} = \frac{1}{R_{min}}$$

where $R_{min}$ is the local minimum radius of curvature, expressed in meters and $CURV_{max}$ is expressed in dioptres.

It can be noticed that when the surface is locally spherical, the local minimum radius of curvature $R_{min}$ and the local maximum radius of curvature $R_{max}$ are the same and, accordingly, the minimum and maximum curvatures $CURV_{min}$ and $CURV_{max}$ are also identical. When the surface is aspherical, the local minimum radius of curvature $R_{min}$ and the local maximum radius of curvature $R_{max}$ are different.

From these expressions of the minimum and maximum curvatures $CURV_{min}$ and $CURV_{max}$, the minimum and maximum spheres labeled $SPH_{min}$ and $SPH_{max}$ can be deduced according to the kind of surface considered.

When the surface considered is the object side surface (also referred to as the front surface), the expressions are the following:

$$SPH_{min} = (n-1)*CURV_{min} = \frac{n-1}{R_{max}} \text{ and } SPH_{max} = (n-1)*CURV_{max} = \frac{n-1}{R_{min}}$$

where n is the index of the constituent material of the lens.

If the surface considered is an eyeball side surface (also referred to as the back surface), the expressions are the following:

$$SPH_{min} = (1-n)*CURV_{min} = \frac{1-n}{R_{max}} \text{ and } SPH_{max} = (1-n)*CURV_{max} = \frac{1-n}{R_{min}}$$

where n is the index of the constituent material of the lens.

As is well known, a mean sphere $SPH_{mean}$ at any point on an aspherical surface can also be defined by the formula:

$$SPH_{mean} = \frac{1}{2}(SPH_{min} + SPH_{max})$$

The expression of the mean sphere therefore depends on the surface considered:
if the surface is the object side surface, $$SPH_{mean} = \frac{n-1}{2}\left(\frac{1}{R_{min}} + \frac{1}{R_{max}}\right)$$

if the surface is an eyeball side surface, $$SPH_{mean} = \frac{1-n}{2}\left(\frac{1}{R_{min}} + \frac{1}{R_{max}}\right)$$

A cylinder CYL is also defined by the formula $CYL=|SPH_{max}-SPH_{min}|$

The characteristics of any aspherical face of the lens may be expressed by the local mean spheres and cylinders.

For an aspherical surface, a local cylinder axis $\gamma_{AX}$ may further be defined.

The cylinder axis $\gamma_{AX}$ is the angle of the orientation of the maximum curvature $CURV_{max}$ with relation to a reference axis and in the chosen sense of rotation. In the above defined convention, the reference axis is horizontal (the angle of this reference axis is 0°) and the sense of rotation is counter-clockwise for each eye, when looking at the wearer (0° £$\gamma_{AX}$£180°). An axis value for the cylinder axis $\gamma_{AX}$ of +45° therefore represents an axis oriented obliquely, which when looking at the wearer, extends from the quadrant located up on the right to the quadrant located down on the left.

According to a preferred embodiment of the invention, the optical lens is an ophthalmic lens adapted for a wearer and at least one of the criteria of one of the surface cost functions of the set of surface cost functions is related to the wearer's prescription.

Furthermore, a progressive multifocal lens may also be defined by optical characteristics, taking into consideration the situation of the person wearing the lenses. Thus the criteria of the cost functions may be optical criteria.

Figure 3:
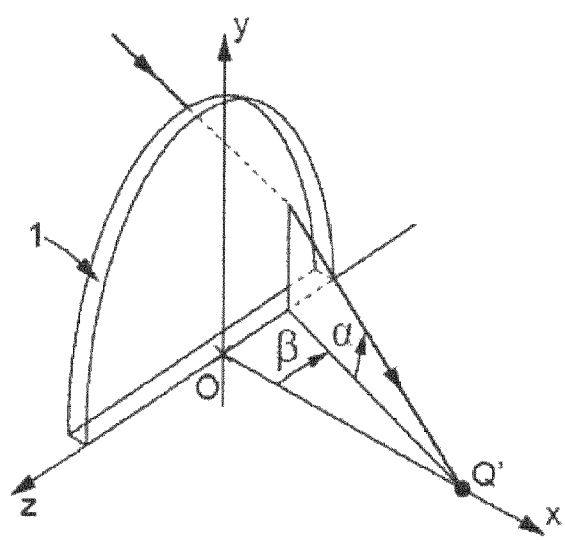

FIGS. 3 and 4 are diagrammatic illustrations of optical systems of eye and lens, thus showing the definitions used in the description. More precisely, FIG. 3 represents a perspective view of such a system illustrating parameters α and β used to define a gaze direction. FIG. 4 is a view in the vertical plane parallel to the antero-posterior axis of the wearer's head and passing through the center of rotation of the eye in the case when the parameter β is equal to 0.

The center of rotation of the eye is labeled Q'. The axis Q'F', shown on FIG. 4 in a dot-dash line, is the horizontal axis passing through the center of rotation of the eye and extending in front of the wearer—that is the axis Q'F' corresponding to the primary gaze view. This axis cuts the aspherical surface of the lens on a point called the fitting cross, which is present on lenses to enable the positioning of lenses in a frame by an optician. The point of intersection of the rear surface of the lens and the axis Q'F' is the point O. O can be the fitting cross if it is located on the rear surface. An apex sphere, of center Q', and of radius q', is tangential to the rear surface of the lens in a point of the horizontal axis. As examples, a value of radius q' of 25.5 mm corresponds to a usual value and provides satisfying results when wearing the lenses.

A given gaze direction—represented by a solid line on FIG. 3—corresponds to a position of the eye in rotation around Q' and to a point J of the apex sphere; the angle β is the angle formed between the axis Q'F' and the projection of the straight line Q'J on the horizontal plane comprising the axis Q'F'; this angle appears on the scheme on FIG. 3. The angle α is the angle formed between the axis Q'J and the projection of the straight line Q'J on the horizontal plane comprising the axis Q'F'; this angle appears on the scheme on FIGS. 3 and 4. A given gaze view thus corresponds to a point J of the apex sphere or to a couple (α, β). The more the value of the lowering gaze angle is positive, the more the gaze is lowering and the more the value is negative, the more the gaze is rising.

In a given gaze direction, the image of a point M in the object space, located at a given object distance, is formed between two points S and T corresponding to minimum and maximum distances JS and JT, which would be the sagittal and tangential local focal lengths. The image of a point in the object space at infinity is formed, at the point F'. The distance D corresponds to the rear frontal plane of the lens.

Ergorama is a function associating to each gaze direction the usual distance of an object point. Typically, in far vision following the primary gaze direction, the object point is at infinity. In near vision, following a gaze direction essentially corresponding to an angle α of the order of 35° and to an angle β of the order of 5° in absolute value toward the nasal side, the object distance is of the order of 30 to 50 cm. For more details concerning a possible definition of an ergorama, U.S. Pat. No. 6,318,859 may be considered. This document describes an ergorama, its definition and its modeling method. For a method of the invention, points may be at infinity or not. Ergorama may be a function of the wearer's ametropia.

Using these elements, it is possible to define a wearer optical power and astigmatism, in each gaze direction. An object point M at an object distance given by the ergorama is considered for a gaze direction (a,b). An object proximity ProxO is defined for the point M on the corresponding light ray in the object space as the inverse of the distance MJ between point M and point J of the apex sphere:

$$ProxO=1/MJ$$

This enables to calculate the object proximity within a thin lens approximation for all points of the apex sphere, which is used for the determination of the ergorama. For a real lens, the object proximity can be considered as the inverse of the distance between the object point and the front surface of the lens, on the corresponding light ray.

For the same gaze direction (α,β), the image of a point M having a given object proximity is formed between two points S and T which correspond respectively to minimal and maximal focal distances (which would be sagittal and tangential focal distances). The quantity ProxI is called image proximity of the point M:

$$ProxI = \frac{1}{2}\left(\frac{1}{JT} + \frac{1}{JS}\right)$$

By analogy with the case of a thin lens, it can therefore be defined, for a given gaze direction and for a given object proximity, i.e. for a point of the object space on the corresponding light ray, an optical power Pui as the sum of the image proximity and the object proximity.

$$Pui = ProxO + ProxI$$

With the same notations, an astigmatism Ast is defined for every gaze direction and for a given object proximity as:

$$Ast = \left|\frac{1}{JT} - \frac{1}{JS}\right|$$

This definition corresponds to the astigmatism of a ray beam created by the lens. It can be noticed that the definition gives, in the primary gaze direction, the classical value of astigmatism. The astigmatism angle, usually called axis, is the angle γ. The angle γ is measured in the frame $\{Q', x_m, y_m, z_m\}$ linked to the eye. It corresponds to the angle with which the image S or T is formed depending on the convention used with relation to the direction $z_m$ in the plane $\{Q', z_m, y_m\}$.

Possible definitions of the optical power and the astigmatism of the lens, in the wearing conditions, can thus be calculated as explained in the article by B. Bourdoncle et al., entitled "Ray tracing through progressive ophthalmic lenses", 1990 International Lens Design Conference, D. T. Moore ed., Proc. Soc. Photo. Opt. Instrum. Eng. Standard wearing conditions are to be understood as the position of the lens with relation to the eye of a standard wearer, notably defined by a pantoscopic angle of −8°, a lens-pupil distance of 12 mm, a pupil-eye rotation center of 13.5 mm and a wrap angle of 0°. The pantoscopic angle is the angle in the vertical plane between the optical axis of the spectacle lens and the visual axis of the eye in the primary position, usually taken to be the horizontal. The wrap angle is the angle in the horizontal plane between the optical axis of the spectacle lens and the visual axis of the eye in the primary position, usually taken to be the horizontal. Other conditions may be used. Wearing conditions may be calculated from a ray-tracing program, for a given lens. Further, the optical power and the astigmatism may be calculated so that the prescription is either fulfilled at the reference points (i.e control points in far vision) and for a wearer wearing his spectacles in the wearing conditions or measured by a frontofocometer.

FIG. 5 represents a perspective view of a configuration wherein the parameters α and β are non zero. The effect of rotation of the eye can thus be illustrated by showing a fixed frame $\{x, y, z\}$ and a frame $\{x_m, y_m, z_m\}$ linked to the eye. Frame $\{x, y, z\}$ has its origin at the point Q'. The axis x is the axis Q'O and it is oriented from the lens toward the eye. The y axis is vertical and oriented upwardly. The z axis is such that the frame $\{x, y, z\}$ be orthonormal and direct. The frame $\{x_m, y_m, z_m\}$ is linked to the eye and its center is the point Q'. The $x_m$ axis corresponds to the gaze direction JQ'. Thus, for a primary gaze direction, the two frames $\{x, y, z\}$ and $\{x_m, y_m, z_m\}$ are the same. It is known that the properties for a lens may be expressed in several different ways and notably in surface and optically. A surface characterization is thus equivalent to an optical characterization. In the case of a blank, only a surface characterization may be used. It has to be understood that an optical characterization requires that the lens has been machined to the wearer's prescription. In contrast, in the case of an ophthalmic lens, the characterization may be of a surface or optical kind, both characterizations enabling to describe the same object from two different points of view. Whenever the characterization of the lens is of optical kind, it refers to the ergorama-eye-lens system described above. For simplicity, the term 'lens' is used in the description but it has to be understood as the 'ergorama-eye-lens system'. The value in surface terms can be expressed with relation to points.

The values in optic terms can be expressed for gaze directions. Gaze directions are usually given by their degree of lowering and azimuth in a frame whose origin is the center of rotation of the eye. When the lens is mounted in front of the eye, a point called the fitting cross is placed before the pupil or before the eye rotation center Q' of the eye for a primary gaze direction. The primary gaze direction corresponds to the situation where a wearer is looking straight ahead. In the chosen frame, the fitting cross corresponds thus to a lowering angle α of 0° and an azimuth angle β of 0° whatever surface of the lens the fitting cross is positioned—rear surface or front surface.

The above description made with reference to FIGS. 3 to 5 was given for central vision. In peripheral vision, as the gaze direction is fixed, the center of the pupil is considered instead of center of rotation of the eye and peripheral ray directions are considered instead of gaze directions. When peripheral vision is considered, angle α and angle β correspond to ray directions instead of gaze directions.

A global cost function is defined and evaluated during the global cost function evaluation step S41.

The global cost function G is a weighted sum of the first surface cost function and the each surface cost function of the set of cost functions, i.e.

$$G = \sum_{i=1}^{P} \alpha_i \times J_i$$

with $\alpha_i$ the weight of the ith cost function and $\sum_{i=1}^{P}\alpha_i=1$.

According to an embodiment of the invention, the weight $\alpha_1$ of the first cost function is comprised between 0.001 and 0.1.

During the modifying step S42, the working surface WS is modified and the global cost function is revaluated for the modified working surface.

The evaluation and modifying steps are repeated so as to minimize the global cost function. The working surface WS having the smallest global cost function can be considered as the best compromised between the criterion over the evaluation zone and the overall smoothness of the optical surface.

According to an embodiment of the invention, instead of having the working optical surface defining step, the global surface cost function evaluation step and the modifying step S42 the method may comprise an optical surface parameter determining step. During the optical surface parameter determining step at least one optical surface parameter that minimizes the global surface cost function is determined.

The method according to the invention may be implemented to optimize a surface of an ophthalmic lens, for example the front surface of an ophthalmic lens adapted for a wearer.

In particular, the method according to the invention may be used to optimize the front surface of an optical lens so as to perfectly fit a selected spectacle frame.

Therefore, the method may further comprise prior to the global surface cost function evaluation step S41 a contour data providing step S410 during which contour data representing a contour of a spectacle frame is provided. Furthermore, so as to realize a perfect fit between the front face of the optical lens and the spectacle frame, at least one of the surface cost functions of the set of surface cost functions is function of the deviation between the contour of the spectacle frame and the surface of the ophthalmic lens.

The deviation between the contour of the spectacle frame and the surface of the ophthalmic lens may be defined by considering the difference of the Z coordinate between each contour point (X,Y,Z) of a set of points of the contour of the spectacle frame and the corresponding surface point (X,Y,Z') of the surface of the ophthalmic lens at the same coordinates (X,Y).

The deviation between the contour of the spectacle frame and the surface of the ophthalmic lens may be defined by considering the difference of coordinates between each contour point of a set of points of the contour and the surface point of the surface for which the normal to the surface at said surface point intersects said contour point. The deviation between the contour of the spectacle frame and the surface of the ophthalmic lens may be defined as the sum, the maximum, or the mean value of the differences between each point of the set of points of the contour and the surface as defined previously.

The skilled person may consider any other known way to define the deviation between the contour of the spectacle frame and the surface of the ophthalmic lens.

According to such embodiment of the invention, the front face of the optical lens is the best compromise between the optical criteria defined for example in the near, far and intermediate vision zones and the shape of the spectacle frame selected by the wearer. Advantageously, the optical lens having such surface will fit more easily and surely in the selected spectacle frame.

According to an embodiment of the invention the weight of the cost functions can be optimized so as to have the deviation between the contour of the spectacle frame and the surface of the ophthalmic lens as close as possible to a desired value.

For example, the method of optimizing an optical surface according to the invention is implemented by varying the weights of the cost functions, in particular the first cost function and the cost function function of the deviation between the contour of the spectacle frame and the surface of the ophthalmic lens, so as to have the deviation between the contour of the spectacle frame and the surface of the ophthalmic lens as close as possible to the desired value.

The shape of the spectacle frame may be provided from frame shape data base or may be measured by an operator.

When an operator measures the contour of a spectacle frame, the contour data obtained corresponds to a list of points coordinates. Such list of coordinates may not be accurate enough to be used in the method according to the invention. Indeed, minimizing the cost function function of the deviation between the contour of the spectacle frame and the surface of the ophthalmic lens when the contour data are a list of points may be in conflict with providing a smooth surface, i.e. minimizing the first cost function.

Therefore, the invention proposes a method for optimizing a measured contour of a spectacle frame comprising:
a contour data providing step S410,
a working contour defining step S411,
a first contour cost function providing step S412,
a set of contour cost functions providing step S413,
a global contour cost function evaluation step S414, and
a contour modifying step S415, According to an embodiment of the invention the global contour cost function evaluation and contour modifying steps are repeated so as to minimize the global contour cost function.

The measured points of the contour are provided during the contour data providing step. Such measured points may be obtained using known measuring devices.

During the working contour defining step, a working contour Cw is defined. For example, the working contour may be obtained by joining each of the points of the contour data or by considering the mean values of the data points.

According to an alternative embodiment, the working contour Cw may be obtained by considering a plurality of mean values of two or more consecutive data points.

A first contour cost function Jc1 is provided during the first contour cost function providing step. The first contour cost function Jc1 is function of the mth derivative of the curve of at least a portion, for example the entire, of the working contour Cw.

According to an embodiment of the invention, m is an integer greater than or equal to 2 and smaller than or equal to 4.

A set of contour cost functions (Jc2, Jc3, . . . Jck) are provided during the contour cost functions providing step, with k an integer greater than or equal to 2, i.e. the set of contour cost functions comprises at least one contour cost function.

Each contour cost function of the set of contour cost functions is defined on part of the contour and is a function of at least the deviation between the working contour and part of the measured points of the contour. For example, each cost function is defined so as to be minimal when the deviation between the working contour and part of the measured points of the contour is minimal.

As an alternative embodiment, at least one, for example all, of the contour cost functions of the set of contour cost functions is defined on the whole contour.

A global contour cost function is defined and evaluated during the global cost function evaluation step. The global cost function is a weighted sum of the first contour cost function and of each of the contour cost function of the set of contour cost functions, i.e.

$$Gc = \sum_{i=1}^{k} \beta_i \times J_{ci}$$

with $\beta_i$ the weight of the ith contour cost function and $\sum_{i=1}^{k} \beta_i = 1$.

According to an embodiment, the weight $\beta_1$ of the first contour cost function is greater than or equal to 0.001 and smaller than or equal to 0.05

The working contour is modified during the contour modifying step and the global contour cost function is reevaluated for the modified working contour.

The contour modifying step and the global cost function evaluation step are repeated so as to obtain a working contour for which the global cost function is minimum.

Advantageously, the obtained working contour has a smooth curvature, thanks to the first contour cost function and is an accurate representation of the contour, thanks to the further contour cost functions.

Having a plurality of contour cost functions in the set of cost function allows having different weights for different parts of the contour of the spectacle frame. One may want to give a greater weight to certain parts of the contour over others. This may be done by defining different contour cost functions and attributing different weights to each contour cost function.

According to an embodiment of the invention, the method may further comprise a maximum deviation step during which a maximum deviation value between the measured points of the contour and the optimized contour is defined and during which a weight (for example the weight associated to the first cost function) is adjusted so that the maximum deviation between the measured points and the optimized contour is equal to said maximum deviation value.

The invention further relates to a weight optimization method during which the weights of the cost functions of a method of optimizing a measured contour according to the invention, in particular of the first cost function, are adapted so as to have the deviation between the measured points and the contour as close as possible to a desired value.

For example, during such weight optimization method the method of optimizing a measured contour according to the invention is implemented by varying the weights of the cost functions so as to minimize the deviation between the measured points and the contour. The invention has been described above with the aid of embodiments without limitation of the general inventive concept.

While in the embodiments described in detail the optical surface to be optimized is the front surface of an ophthalmic lens, it will be understood, that in alternative embodiments of the invention the optical surface to optimize may be the back surface of the ophthalmic lens.

Furthermore, while in the embodiments described it is suggested that the back surface of the optical lens is formed by a machining process, it will be understood, that in alternative embodiments of the invention both or either surfaces of the lens may be formed by a machining process.

Moreover, although the surface to be optimized is represented as concave, it will be appreciated that this surface could equally well be convex or any other curved surface.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method for determining at least one optical surface of an optical lens, the method comprising:

providing at least one parameter that defines the at least one optical surface to be determined, and an initial value of said at least one parameter defining an initial optical surface;

defining a working optical surface to be equal to at least a portion of the initial optical surface;

providing a first surface cost function, the first surface cost function being a function of the nth derivative of the working optical surface defined by the at least one parameter with n being an integer greater than or equal to 2;

providing a set of surface cost functions, each surface cost function of the set of surface cost functions being a function of at least one criterion over an evaluation zone of the working optical surface defined by the at least one parameter and the set of surface cost functions comprising at least one cost function;

evaluating a global surface cost function, the global surface cost function being a weighted sum of the first surface cost function and each surface cost function of the set of surface cost functions;

modifying the working optical surface; and determining a value of the at least one optical surface parameter that minimizes the global surface cost function by repeating the evaluating of the global surface cost function and the modifying of the working optical surface so as to minimize the global surface cost function.

2. The method according to claim 1, wherein the at least one criterion of each surface cost function of the set of surface cost functions is a surface criterion over at least a part of the evaluation zone.

3. The method according to claim 2, wherein the at least one criterion of each surface cost function of the set of surface cost functions is selected in a list consisting of: the minimum, maximum or mean sphere in at least one point of the evaluation zone, a mean sphere over the evaluation zone, a cylinder in at least one point of the evaluation zone, a mean cylinder over the evaluation zone, an altitude of at least one point of the evaluation zone, a mean altitude over the evaluation zone, a gradient of minimum, maximum, or mean sphere in at least one point of the evaluation zone, the second order derivation of the sphere in at least one point of the evaluation zone, a Gauss curvature in at least one point of the evaluation zone, a gradient of the Gauss curvature in at least one point of the evaluation, a minimal curvature in at least one point of the evaluation zone, a normal curvature in at least one point of the evaluation zone.

4. The method according to claim 1, wherein the evaluation zone of each surface cost function of the set of surface cost functions is selected in a list consisting of: near vision zone, far vision zone, the intermediate corridor between the near and far vision zone, a peripheral rim, a nasal zone, and a temporal zone.

5. The method according to claim 1, wherein the optical lens is an ophthalmic lens adapted for a wearer and at least one of the criteria of one of the surface cost functions of the set of surface cost functions is related to the wearer's prescription.

6. The method according to claim 1, wherein n is smaller than or equal to 4.

7. The method according to claim 1, wherein in the global surface cost function the weight of the first surface cost function represents between 0.1% and 10% of the total weights.

8. The method according to claim 1, wherein
the optical lens is an ophthalmic lens adapted for a wearer, the method further comprises, prior to the determining of the value of the at least one optical surface parameter, providing contour data representing a contour of a spectacle frame, and at least one of the surface cost functions of the set of surface cost functions is function of a deviation between the contour of the spectacle frame and the surface of the ophthalmic lens.

9. The method according to claim 8, wherein the provided contour data is obtained by a method for optimizing a measured contour of the spectacle frame, the method comprising:

providing contour data representing measured points of a contour of the spectacle frame, defining a working contour of the spectacle frame, providing a first contour cost function, the first contour cost function being a function of the mth derivative of a curve of at least a portion of the working contour with m being an integer greater than or equal to 2, providing a set of contour cost functions, each contour cost function of the set of contour cost functions being a function of at least a deviation between the working contour and the measured points of the contour and the set of contour cost functions comprising at least one contour cost function, evaluating a global contour cost function, the global contour cost function being a weighted sum of the first contour cost function and of each contour cost function of the set of contour cost functions, and modifying the working contour, wherein the evaluating of the global contour cost function and the modifying of the working contour are repeated so as to minimize the global contour cost function.

10. The method according to claim 9, wherein m is smaller than or equal to 4.

11. The method according to claim 9, wherein the first contour cost function is a function of the mth derivative of a curve of the entire working contour.

12. The method according to claim 9, wherein in the global contour cost function the weight of the first contour cost function represents between 0.1% and 10% of the total weights.

13. A nontransitory computer-readable storage medium having stored therein a program comprising one or more stored sequences of instructions, which when executed by a processor, causes the processor to carry out the steps of claim 1.

* * * * *